United States Patent
Schneider et al.

(10) Patent No.: US 8,513,960 B2
(45) Date of Patent: Aug. 20, 2013

(54) PROBE FOR A CAPACITIVE SENSOR DEVICE AND GAP-MEASURING SYSTEM

(75) Inventors: René Schneider, Munich (DE); Alfred Ecker, Munich (DE); Gerhard Heider, Hollenbach (DE)

(73) Assignee: MTU Aero Engines GmbH, Munich (DE)

(*) Notice: Subject to any disclaimer, the term of this patent is extended or adjusted under 35 U.S.C. 154(b) by 274 days.

(21) Appl. No.: 12/865,366

(22) PCT Filed: Jan. 20, 2009

(86) PCT No.: PCT/DE2009/000063
§ 371 (c)(1),
(2), (4) Date: Jul. 29, 2010

(87) PCT Pub. No.: WO2009/094985
PCT Pub. Date: Aug. 6, 2009

(65) Prior Publication Data
US 2011/0006791 A1    Jan. 13, 2011

(30) Foreign Application Priority Data
Jan. 30, 2008 (DE) .................. 10 2008 006 833

(51) Int. Cl.
*G01R 27/26* (2006.01)
(52) U.S. Cl.
USPC ......................................... 324/690
(58) Field of Classification Search
USPC ......................................... 324/690
See application file for complete search history.

(56) References Cited

U.S. PATENT DOCUMENTS

| | | | |
|---|---|---|---|
| 4,804,905 A | 2/1989 | Ding et al. | |
| 4,950,084 A | 8/1990 | Bailleul et al. | |
| 5,101,165 A * | 3/1992 | Rickards | 324/662 |
| 5,166,626 A | 11/1992 | Hester et al. | |
| 5,760,593 A | 6/1998 | Lawrence et al. | |
| 5,892,365 A * | 4/1999 | Bailleul et al. | 324/690 |
| 6,989,679 B2 * | 1/2006 | Lieder et al. | 324/688 |
| 8,141,429 B2 * | 3/2012 | Guo | 73/718 |
| 2007/0108050 A1* | 5/2007 | Elliott | 204/424 |

FOREIGN PATENT DOCUMENTS

| | | |
|---|---|---|
| DE | 34 33 351 C1 | 1/1986 |
| DE | 60 2004 004 909 T2 | 10/2007 |
| EP | 0 246 576 61 | 11/1987 |

OTHER PUBLICATIONS

PCT/DE2009/000063 PCT/ISA/210.

* cited by examiner

*Primary Examiner* — Jeff Natalini
(74) *Attorney, Agent, or Firm* — Crowell & Moring LLP

(57) ABSTRACT

A probe for a capacitive sensor device, and a gap measuring system using the probe, is disclosed. The probe has a probe head including a measuring element with at least one measuring and front face, a first electrically non-conductive isolator element, and a first partial element of a first shield. The measuring and front face, the first isolator element, and the first partial element of the first shield are adhesively connected to one another and configured as a multilayer, where the first isolator element is disposed between the measuring element with its measuring and front face and the first partial element.

24 Claims, 3 Drawing Sheets

PROBE FOR A CAPACITIVE SENSOR DEVICE AND GAP-MEASURING SYSTEM

This application claims the priority of International Application No. PCT/DE2009/000063, filed Jan. 20, 2009, and German Patent Document No. 10 2008 006 833.0, filed Jan. 30, 2008, the disclosures of which are expressly incorporated by reference herein.

BACKGROUND AND SUMMARY OF THE INVENTION

The invention relates to a probe for a capacitive sensor device with an outer sleeve and at least one probe head arranged within the outer sleeve, the probe head comprising a measuring element with at least one measuring and front face, the measuring element being made of a metal, a metal alloy or an electrically conductive ceramic or being coated at least at the measuring and front face with a metal, a metal alloy or an electrically conductive ceramic and a first electrically non-conductive isolator element and a first partial element of a first shield, wherein the first partial element is made of a metal, a metal alloy or an electrically conductive ceramic. The invention also relates to a gap measuring system for determining a rotor gap.

These types of probes are already known from the prior art and are used in a wide variety of industrial measuring applications. These types of probes measure distances of movable parts relative to one another, such as components of machines, particularly turbomachines of all types. In particular, in the case of turbomachines, the size of the distance or the gap between a rotor blade and the surrounding housing has an effect on so-called leakage losses, which in turn impact the efficiency of the machine. Capacitive probes are known from German Patent Document No. DE 34 33 351 C1 and European Patent Document No. EP 0 246 576 B1. These probes feature a triaxial structure and are used in particular for measuring the gap between a housing and corresponding rotor blades in aircraft gas turbines, wherein the runtime signal of the probes is used for non-contacting blade oscillation measurement. Due to the triaxial structure of these known probes and the thereby induced enclosure of different materials, such as for example, ceramic and metal or metal alloys with different coefficients of thermal expansion, cracks may occur when using these types of probes at higher temperatures. Particularly when using these types of probes in gas turbines of aircraft engines, service lives of 10,000 hours and more are required, during which time the probes must supply reliable measured values of the rotor gap. In this case, depending on the concrete design of the turbomachine, the probe is exposed to varying temperatures of up to greater than 700° C., high pressures, oscillations and other stresses from water, salt, oil, dirt, metallic abrasion and the like. To avoid temperature-induced stress cracks, German Patent Document No. DE 60 2004 004 909 T2 discloses a sensor for the capacitive measurement of the distance to a stationary object or one passing by, in which all elements are configured of electrically conductive or electrically non-conductive ceramic materials and the materials are selected in such a way that they have similar coefficients of thermal expansion. However, the disadvantage of this sensor is that material selection is very restricted on the one hand, which results in the design and manufacture of this sensor being complex and expensive. In addition, because of the restricted material selection, the measuring precision of the sensor is not guaranteed over the entire service life of the sensor.

As a result, the object of the present invention is making available a probe and a gap measuring system of the type cited at the outset, which is useable at high temperatures and guarantees measuring precision as well as a long service life.

Advantageous embodiments of the probe, to the extent to which they may be applicable, should be viewed as advantageous embodiments of the gap measuring system and vice versa.

A probe for a capacitive sensor device according to the invention has an outer sleeve and at least one probe head arranged within the outer sleeve, wherein the probe head comprises a measuring element with at least one measuring and front face, the measuring element being made of a metal, a metal alloy or an electrically conductive ceramic or being coated at least at the measuring and front face with a metal, a metal alloy or an electrically conductive ceramic and a first electrically non-conductive isolator element and a first partial element of a first shield, wherein the first partial element is made of a metal, a metal alloy or an electrically conductive ceramic. In this case, the measuring element, the first isolator element and the first partial element of the first shield are adhesively connected to one another and configured as a multilayer, the first isolator element being disposed between the measuring element with the measuring and front face and the first partial element. Because of the inventive layered structure of the probe head and the adhesive connection of the individual elements of the probe head among one other, thermal expansion of the individual elements is possible in an almost unhindered manner. In particular, a sheathing of the electrically non-conductive materials by the electrically conductive materials and vice versa is avoided so that even with different coefficients of thermal expansion of the materials, it is not possible for stress cracks to occur. Because non-positive or positive connections are not used, the probe is also mechanically stable over a wide temperature range. Because it is possible to use metal or metal alloys to form the measuring element or the measuring and front face of the measuring element, this results in a high level of measuring precision with respect to possible changes in capacitance. A very long service life for the probe is guaranteed by the high level of mechanical stability and the possibility of thermal expansion of the different materials. In a preferred embodiment of the invention, the layering of the probe head that is configured as a multilayer is configured to be approximately perpendicular to a longitudinal axis of the probe.

In other advantageous embodiments of the probe according to the invention, the probe head is arranged in a shielding sleeve made of metal, a metal alloy or an electrically conductive ceramic and surrounded by the shielding sleeve, wherein the shielding sleeve is adhesively connected to the first partial element. Because of the shielding sleeve, the non-homogenous boundary area of the electrical field of the probe head, in particular the measuring and front face of the measuring element, is shielded. This results in an approximately parallel electrical field between the probe and a counter electrode opposite from the measuring and front face, whose changes in capacitance can be detected with a high level of measuring precision. In addition, peripherally occurring interference areas can be shielded reliably. Furthermore, the probe may have a probe body arranged within the outer sleeve, wherein the probe body has a second partial element with the first shield made of a metal, a metal alloy or an electrically conductive ceramic, a second electrically non-conductive isolator element and a first partial element of the second shield, wherein the first partial element is made of a metal, a metal alloy or an electrically conductive ceramic. In this case, the second partial element of the first shield, the second isolator element and the first partial element of the second shield are also adhesively connected to one another and configured as a multilayer, wherein the second isolator element is disposed between the second partial element of the first shield and the first partial element of the second shield. Because of this type of embodiment of the probe body, a high level of mechanical stability of the probe body or of the probe is again guaranteed as a whole over a wide temperature range. The layered structure of the probe body in turn makes possible the almost unhindered thermal expansion of the individual elements of the probe body, thereby avoiding temperature-induced cracks. In particular, again a sheathing of the electrically non-conductive materials by the electrically conductive materials and vice versa is avoided so that even with different coefficients of thermal expansion of the materials, it is not possible for stress cracks to occur.

In another advantageous embodiment of the probe according to the invention, the first partial element and the second partial element of the first shield are adhesively connected to one another. This produces a high level of mechanical stability for this connection between the probe head and the probe body. In addition, it is possible also for the layering of the probe body that is configured as a multilayer to be configured approximately perpendicular to the longitudinal axis of the probe.

In another advantageous embodiment of the probe according to the invention, the first partial element of the second shield is at least partially adhesively connected to a second partial element of the second shield, wherein the second partial element is also made of metal, a metal alloy or an electrically conductive ceramic and configured as a holder for the probe body and the therewith connected probe head within the outer sleeve. The adhesive connection of the partial elements of the second shield in turn guarantees a high level of mechanical stability of this element over a wide temperature range. In addition, the second partial element may advantageously have at least one shoulder, which is located at least partially circumferentially on its outer circumference, for bearing on at least one projection configured on the inner circumference of the outer sleeve. This guarantees a secure connection and positioning of the probe within the outer sleeve.

In another advantageous embodiment of the probe according to the invention, a radially circumferential gap is configured between the inner circumference of the outer sleeve and the shielding sleeve. In addition, it is possible for the gap to extend at least into the region of the second isolator element. The radially circumferential gap advantageously supports the expansion possibilities of the different materials of the probe, in particular the probe head, the probe body and the shielding sleeve in the case of a corresponding temperature effect. A thermal expansion is readily possible, temperature-induced stress cracks are reliably prevented.

In other advantageous embodiments of the probe according to the invention, the first and the second isolator element are made of a non-conductive ceramic, in particular $AL_2O_3$ or glass. In addition, the materials for the measuring element with the measuring and front face, the elements of the first and second shield and the first and second isolator element may be selected such that they have similar coefficients of thermal expansion. This measure also prevents possible temperature-induced stress cracks within the probe. In this case, particularly the material for the measuring element with the measuring and front face and the elements of the first and second shield may be an iron-nickel-cobalt alloy with a low coefficient of thermal expansion. These types of materials are known for example, under the trade names of Vacon 11 and ALLOY42. In addition, the elements of the probe head and/or the elements of the probe body may be vacuum soldered, wherein silver titanium is preferably used as the soldering material. All other connections between elements of the probe may be configured to be laser welded also as an adhesive connection.

In another advantageous embodiment of the probe according to the invention, the probe is connected to a triaxial cable, wherein an inner conductor of the triaxial cable is connected in an electrically conductive manner to the measuring element or the measuring and front face, a center shield of the triaxial cable is connected in an electrically conductive manner to the second partial element of the first shield and an outer shield of the triaxial cable is connected in an electrically conductive manner to the second partial element of the second shield. In this case, passage openings are configured along the longitudinal axis of the probe for the passage of the inner conductor, of the center shield and of the outer shield of the triaxial cable. In an advantageous embodiment, the diameter of the passage opening in the region of the first isolator element and/or the first partial element of the first shield is larger at least in sections than the diameter of the inner conductor. In addition, it is possible for the diameter of the passage opening in the region of the second isolator element and/or the first partial element of the second shield to be larger at least in sections than the diameter of the center shield. The passage enlargements guarantee that the material surrounding the passage openings or the surrounding materials may expand relatively unhindered in the case of the effect of temperature. As a result, a possible crack formation due to different coefficients of thermal expansion of the materials of the individual elements is reliably counteracted also in these regions of the probe.

In another advantageous embodiment of the probe according to the invention, the passage opening arranged on the end of the second partial element of the second shield that faces away from the measuring and front face is configured to be asymmetrically funnel-shaped with respect to the lateral cable exit and cable entry of the triaxial cable. The lateral cable exit and cable entry of the triaxial cable advantageously reduce the construction height of the probe according to the invention.

In another advantageous embodiment of the invention, the probe head is configured conically, wherein it tapers in the direction of the measuring and front face, and the shielding sleeve has at least one projection formed on its inner circumference to hold the probe head. As a result, this guarantees a secure positioning and fastening of the probe head within the shielding sleeve.

In other advantageous embodiments of the probe according to the invention, the probe or the probe body and/or the probe head is disposed in a spacer sleeve. As a result, the distance from the object being measured can be configured in a variable manner, and additionally, the probe may be readily calibrated because of modified distances. In particular, the outer sleeve of the probe may be configured as a spacer sleeve, wherein the sleeve may then be clamped to the surrounding housing of the corresponding component. The probe may also be welded to the housing.

A gap measuring system according to the invention for determining a rotor gap between a rotor comprising rotor blades and a rotor housing, which surrounds at least sections of the rotor or rotor blades, of a turbomachine features at least one capacitive sensor device having an electrode and a counter electrode for determining the capacitance measured values that characterize the rotor gap, wherein the rotor or the rotor blades is/are switchable as the counter electrode of the sensor device and the electrode is a probe according to the invention, as has been described in the foregoing. In this case, the turbomachine may be in particular a gas turbine of an aircraft engine or even a stationary gas turbine, a steam turbine or a turbocharger. Using a probe according to the invention for the gap measuring system guarantees that the system is useable at high temperatures and has a high level of measuring precision as well as a long service life.

Additional advantages, features and details of the invention are disclosed on the basis of the following description of two exemplary embodiments as well as on the basis of the drawings.

DETAILED DESCRIPTION OF THE DRAWINGS

Figure 1:
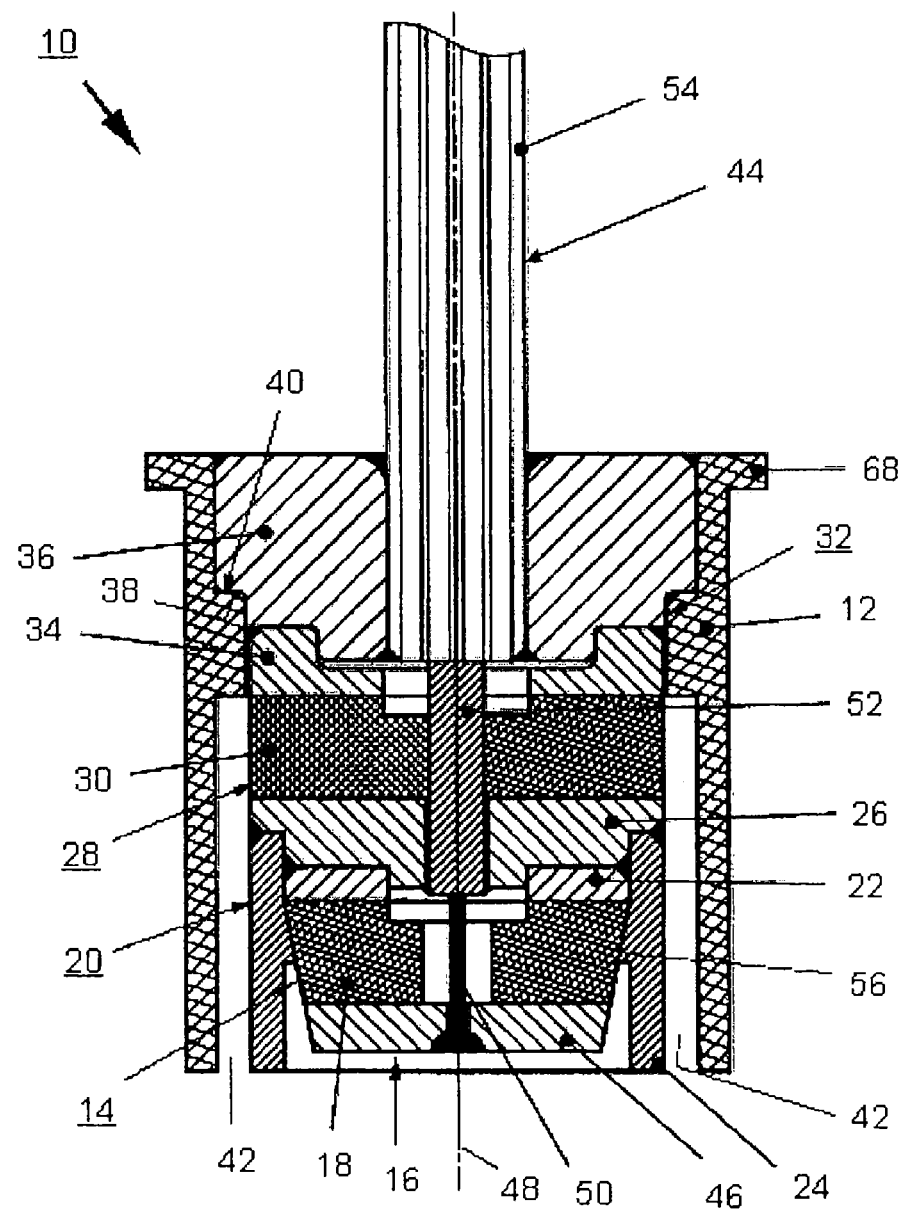
FIG. 1 is a schematic sectional view of a probe according to the invention in accordance with a first exemplary embodiment.

FIG. 1 shows a schematic sectional view of a probe 10 for a capacitive sensor device according to a first exemplary embodiment. The probe 10 in this case has an outer sleeve 12, wherein a probe head 14 is arranged within the outer sleeve 12. The outer sleeve 12 features a circumferential welded collar 68 on the end opposite from the probe head 14, which is variably configurable and positionable. The material of the outer sleeve 12 may be adapted to the material of the surrounding housing, such as, for example, to the housing of an aircraft gas turbine.

The probe head 14 includes a measuring element 46 with a measuring and front face 16, wherein the measuring and front face 16 is facing the object to be measured, in particular a gap. The measuring element 46 in this case is made of a metal, a metal alloy or an electrically conductive ceramic, in particular an iron-nickel-cobalt alloy with a low coefficient of thermal expansion. However, it is also possible for the measuring element 46 to be made of, for example, an electrically non-conductive ceramic and for only the measuring and front face 16 to be coated with the metal, the metal alloy or the electrically conductive ceramic. It is evident that the probe head 14 also includes a first electrically non-conductive isolator element 18, in particular made of a non-conductive ceramic such as $AL_2O_3$ as well as a first partial element 22 of a first shield 20. The first partial element 22 is made in turn of a metal, a metal alloy or an electrically conductive ceramic, in particular an iron-nickel-cobalt alloy. In addition, one can see that the measuring element 46, the first isolator element 18 and the first partial element 22 of the first shield 20 are adhesively connected to one another and configured as a multilayer. In this case, the first isolator element 18 is arranged between the measuring element 46 and the first partial element 22. The layering of the probe head 14 that is configured as a multilayer is configured in this case approximately perpendicular to a longitudinal axis 48 of the probe 10. In addition, the probe head 14 is arranged in a shielding sleeve 24 made of metal, a metal alloy or an electrically conductive ceramic and surrounded by the shielding sleeve, wherein the shielding sleeve 24 is adhesively connected to a second partial element 26. The adhesive connection of these elements may in this case be accomplished, for example, by laser welding. In the depicted exemplary embodiment, the probe head 14 is also configured conically, wherein it tapers in the direction of the measuring and front face 16. The shielding sleeve 24 features a circumferential projection 56 configured on its inner circumference for inserting and holding the conically configured probe head 14.

In addition, the probe 10 has a probe body 28 arranged within the outer sleeve 12. The probe body 28 in this is made up of a second partial element 26 of the first shield 20, a second electrically non-conductive isolator element 30 and a first partial element 34 of a second shield 32. The second partial element 26 of the first shield 20 and the first partial element 34 of the second shield 32 are each made in this case of metal, a metal alloy or an electrically conductive ceramic, in particular an iron-nickel-cobalt alloy. The second isolator element 30 is made in turn of an electrically non-conductive ceramic, in particular $AL_2O_3$. However, it is also conceivable for the first and second shield 20, 32 to be made of glass or other electrical isolators. It is evident that the probe body 28 is also configured as a multilayer, wherein the individual elements are in turn adhesively connected to one another. In this case, the second isolator element 30 is disposed between the second partial element 26 of the first shield 20 and the first partial element 34 of the second shield 32. In addition, the partial elements 22, 26 of the first shield 20 are also adhesively connected to one another. The layering of the probe body 28 that is also configured as a multilayer is in turn configured to be approximately perpendicular to the longitudinal axis 48 of the probe 10.

The second shield 32 also includes a second partial element 36, which is at least partially adhesively connected to the first partial element 34, wherein the second partial element 36 is also made of a metal, a metal alloy or an electrically conductive ceramic, in particular an iron-nickel-cobalt alloy. It is evident that the second partial element 36 is also configured as a holder for the probe body 28 and the therewith connected probe head 14 within the outer sleeve 12. To this end, the second partial element 36 has a shoulder 38, which is located circumferentially on its outer circumference, for bearing on a circumferential projection that is configured on the inner circumference of the outer sleeve 12.

In addition, one can see that a radially circumferential gap 42 is configured between the inner circumference of the outer sleeve 12 and the shielding sleeve 24. According to the exemplary embodiment, the gap 42 extends into the region of the second isolator element 30.

The materials for the measuring element 46 with the measuring and front face 16, the elements 22, 24, 26, 34, 36 of the first and second shield 20, 32 as well as the first and second isolator element 18, 30 are selected in the depicted exemplary embodiment in such a way that they have similar coefficients of thermal expansion. In this case, the coefficients of thermal expansion of the metals, metal alloys or the electrically conductive ceramic used are adapted to those of the materials used for the isolator elements, in particular to the electrically non-conductive ceramic.

The probe 10 is connected to a triaxial cable 44, wherein the triaxial cable 44 is in turn connected to a corresponding evaluation unit (not shown). It is evident that an inner conductor 50 of the triaxial cable 44 is connected in an electrically conductive manner to the measuring element 46 or the measuring and front face 16, a center shield 52 of the triaxial cable 44 is connected in an electrically conductive manner to the second partial element 26 of the first shield 20 and an outer shield 54 of the triaxial cable 44 is connected in an electrically conductive manner to the second partial element 36 of the second shield 32. In this case, the probe 10 has passage openings along its longitudinal axis 48 for the passage of the inner conductor 50, of the center shield 52 and of the outer shield 54 of the triaxial cable 54. In this case, the diameter of the passage opening in the region of the first isolator element 18 and the first partial element 22 of the first shield 20 is larger at least in section than the diameter of the inner conductor 50. In addition, the diameter of the passage opening in the region of the second isolator element 30 and the first partial element 34 of the second shield 32 is also larger at least in sections than the diameter of the center shield 52 of the coaxial cable 44.

Figure 2:
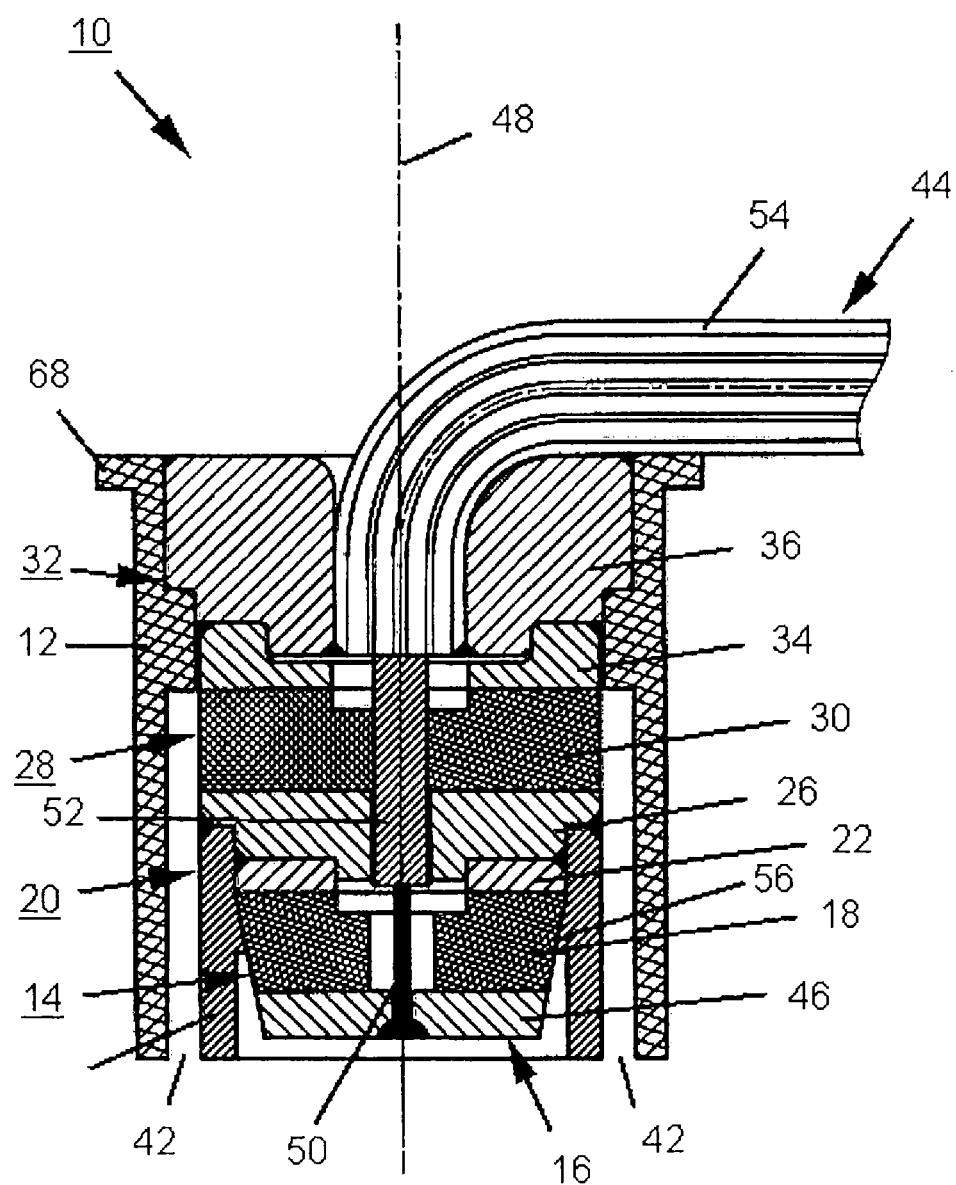
FIG. 2 is a schematic sectional view of a probe according to the invention in accordance with a second exemplary embodiment.

FIG. 2 shows a schematic sectional view of a probe 10 according to a second exemplary embodiment. In contrast to the probe according to the first exemplary embodiment, the passage opening on the end of the second partial element 36 of the second shield 32 that faces away from the measuring and front face 16 is configured to be asymmetrically funnel-shaped. As a result, a lateral cable exit and cable entry of the triaxial cable 44 is possible. In terms of all other features, the probe 10 in FIG. 2 corresponds to the probe described in FIG. 1.

Figure 3:
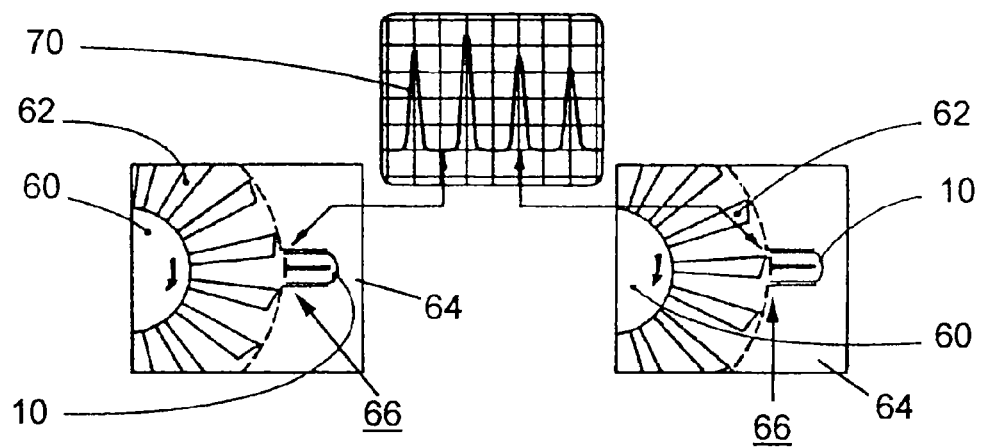
FIG. 3 is a schematic depiction of a gap measuring system according to the invention.

FIG. 3 shows a schematic representation of a gap measuring system according to the invention. The gap measuring system in this case is used for determining a rotor gap between a rotor 60 comprising rotor blades 62 and a rotor housing 64, which surrounds at least sections of the rotor or rotor blades 62, of a turbomachine. The turbomachine in this case is a gas turbine of an aircraft engine, a turbocharger or a stationary gas turbine or a steam turbine. The gap measuring system has a capacitive sensor device 66 with a electrode and a counter electrode for determining the capacitance measured values that characterize the rotor gap. In this case, the rotor 60 or the rotor blades 62 are switchable as the counter electrode of the sensor device 66. The electrode of the capacitive sensor device 66 is formed by a probe 10, an example of which is shown in FIGS. 1 and 2. They therefore form a capacitor, whose capacitance measured values C correspond to the size of the rotor gap in accordance with the general capacitor formula $C=\epsilon_0 * \epsilon_r * A/d$. In addition, FIG. 3 shows the position of the probe 10 relative to the blades 62 of the rotor 60 and the measuring signals 70 generated therewith. On the left side of FIG. 3, a blade gap is located opposite from the probe 10 and on the right side of FIG. 3 a blade tip is located opposite from the probe 10. The rotational direction of the rotor 60 with the blades 62 is indicated respectively by an arrow.

The measuring signal 70 and its association with a specific position of the blades 62 in relation to the probe 10 are also identified by arrows. The measuring signal is always the smallest in the center of a gap between the blades 62 and the greatest at the smallest distance between the blade 62 or its blade tip and the probe 10.

In other application cases, a probe according to the invention may also measure the gap from smooth surfaces depending on the electronic probe driver and/or the measured value acquisition.

The invention claimed is:

1. A probe for a capacitive sensor device, comprising:
an outer sleeve;
a probe head arranged within the outer sleeve, wherein the probe head is comprised by:
a measuring element with a measuring and front face, wherein the measuring element is made of a metal, a metal alloy, or an electrically conductive ceramic, or is coated at least at the measuring and front face with a metal, a metal alloy, or an electrically conductive ceramic;
a first electrically non-conductive isolator element; and
a first partial element of a first shield, wherein the first partial element is made of a metal, a metal alloy, or an electrically conductive ceramic;
wherein the measuring element, the first isolator element, and the first partial element are adhesively connected to one another and configured as a multilayer, wherein the first isolator element is disposed between the measuring element with the measuring and front face and the first partial element; and
a probe body arranged within the outer sleeve, wherein the probe body is comprised by:
a second partial element of the first shield made of a metal, a metal alloy, or an electrically conductive ceramic;
a second electrically non-conductive isolator element; and
a first partial element of a second shield;
wherein the first partial element of the second shield is made of a metal, a metal alloy, or an electrically conductive ceramic;
and wherein the second partial element of the first shield, the second isolator element, and the first partial element of the second shield are adhesively connected to one another and configured as a multilayer, wherein the second isolator element is disposed between the second partial element of the first shield and the first partial element of the second shield;
wherein the probe is connected to a triaxial cable;
wherein an inner conductor of the triaxial cable is connected in an electrically conductive manner to the measuring element;
wherein a center shield of the triaxial cable is connected in an electrically conductive manner to the first partial element or the second partial element of the first shield; and
wherein an outer shield of the triaxial cable is connected in an electrically conductive manner to the first partial element or a second partial element of the second shield.

2. The probe according to claim 1, wherein the probe head multilayer is configured to be approximately perpendicular to a longitudinal axis of the probe.

3. The probe according to claim 1, wherein the probe head is arranged in a shielding sleeve made of metal, a metal alloy, or an electrically conductive ceramic and is surrounded by the shielding sleeve, and wherein the shielding sleeve is adhesively connected to the second partial element of the first shield.

4. The probe according to claim 3, wherein a radially circumferential gap is defined between an inner circumference of the outer sleeve and the shielding sleeve.

5. The probe according to claim 4, wherein the gap extends at least into a region of the second isolator element.

6. The probe according to claim 1, wherein the first partial element and the second partial element of the first shield are adhesively connected to one another.

7. The probe according to claim 1, wherein the probe body multilayer is configured to be approximately perpendicular to a longitudinal axis of the probe.

8. The probe according to claim 1, wherein the first partial element of the second shield is at least partially adhesively connected to the second partial element of the second shield, wherein the second partial element of the second shield is made of a metal, a metal alloy, or an electrically conductive ceramic, and wherein the second partial element of the second shield is a holder for the probe body and the probe head connected therewith in the outer sleeve.

9. The probe according to claim 8, wherein the second partial element of the second shield has at least one shoulder which is located at least partially circumferentially on an outer circumference of the second partial element, and wherein the at least one shoulder bears on at least one projection configured on an inner circumference of the outer sleeve.

10. The probe according to claim 1, wherein the first isolator element and the second isolator element are made of an electrically non-conductive ceramic or glass.

11. The probe according to claim 10, wherein the first isolator element and the second isolator element are made of $Al_2O_3$.

12. The probe according to claim 1, wherein a material of the measuring element, the first shield, the second shield, the first isolator element, and the second isolator element have similar coefficients of thermal expansion.

13. The probe according to claim 12, wherein the material is an iron-nickel-cobalt alloy with a low coefficient of thermal expansion.

14. The probe according to claim 1, wherein the measuring element, the first isolator element, and the first partial element of the probe head and/or the second partial element, the second isolator element, and the first partial element of the probe body are vacuum soldered.

15. The probe according to claim 1, wherein the triaxial cable is designed as hardline (mineral-insulated) or softline.

16. The probe according to claim 1:
wherein the probe has a passage opening along a longitudinal axis of the probe for a passage of the inner conductor, the center shield, and the outer shield of the triaxial cable;
wherein a diameter of the passage opening in a region of the first isolator element and/or the first partial element of the first shield is larger at least in sections than a diameter of the inner conductor and/or wherein a diameter of the passage opening in a region of the second isolator element and/or the first partial element of the second shield is larger at least in sections than a diameter of the center shield.

17. The probe according to claim 16, wherein the passage opening on an end of the second partial element of the second shield that faces away from the measuring and front face is asymmetrically funnel-shaped with respect to a lateral cable exit and cable entry of the triaxial cable.

18. The probe according to claim 1, wherein the probe head is configured conically, wherein the probe head tapers in a direction of the measuring and front face, and wherein a shielding sleeve has at least one projection formed on an inner circumference to hold the probe head.

19. The probe according to claim 1, wherein the probe or the probe body and/or the probe head is designed as a spacer sleeve.

20. The probe according to claim 19, wherein the outer sleeve is configured as a spacer sleeve.

21. A gap measuring system of a turbomachine for determining a rotor gap between a rotor, including rotor blades, and a rotor housing, which surrounds at least sections of the rotor or rotor blades, comprising:
a capacitive sensor device including an electrode and a counter electrode for determining a capacitance measured value that characterizes the rotor gap;
wherein the rotor or the rotor blades is/are switchable as the counter electrode of the capacitive sensor device;
and wherein the electrode of the capacitive sensor device is configured as the probe according to claim 1.

22. The gap measuring system according to claim 21, wherein the turbomachine is a gas turbine of an aircraft engine.

23. The gap measuring system according to claim 21, wherein the turbomachine is a stationary gas turbine or a steam turbine.

24. The gap measuring system according to claim 21, wherein the turbomachine is a turbocharger.

* * * * *